United States Patent [19]
Amini et al.

[11] Patent Number: 5,450,551
[45] Date of Patent: Sep. 12, 1995

[54] SYSTEM DIRECT MEMORY ACCESS (DMA) SUPPORT LOGIC FOR PCI BASED COMPUTER SYSTEM

[75] Inventors: Nader Amini, Boca Raton; Patrick M. Bland, Delray Beach; Bechara F. Boury, Boca Raton; Richard G. Hofmann, Boynton Beach; Terence J. Lohman, Boca Raton, all of Fla.

[73] Assignee: International Business Machines Corporation, Armonk, N.Y.

[21] Appl. No.: 68,477

[22] Filed: May 28, 1993

[51] Int. Cl.[6] .................... G06F 13/364; G06F 13/28
[52] U.S. Cl. ..................... 395/299; 395/308; 395/847; 395/848
[58] Field of Search ........................ 395/325, 425, 725

[56] References Cited

U.S. PATENT DOCUMENTS

| | | | |
|---|---|---|---|
| 5,083,259 | 1/1992 | Maresh et al. | 395/325 |
| 5,101,478 | 3/1992 | Fu et al. | 395/275 |
| 5,265,211 | 11/1993 | Amini et al. | 395/325 |
| 5,276,845 | 1/1994 | Takayama | 395/425 |
| 5,280,623 | 1/1994 | Sodos et al. | 395/325 |
| 5,297,292 | 3/1994 | Morimoto et al. | 395/725 |

*Primary Examiner*—Jack B. Harvey
*Assistant Examiner*—David A. Wiley
*Attorney, Agent, or Firm*—Robert S. Babayi; William N. Hogg

[57] ABSTRACT

A direct memory access (DMA) support mechanism is provided for use in a computer system which comprises (i) a central processing unit (CPU) connected to system memory by a first system bus, and a second system bus connected to the CPU; (ii) a host bridge connecting the second system bus to a peripheral bus; (iii) an input/output (I/O) bridge connecting the peripheral bus to a standard I/O bus, the standard I/O bus having a plurality of standard I/O devices attached thereto; and (v) arbitration logic which functions in an arbitration mode for arbitrating between the plurality of standard I/O devices competing for access to the standard I/O bus, and in a grant mode wherein a selected standard I/O device is granted access to the standard I/O bus. The DMA support mechanism comprises a direct memory access (DMA) controller for performing DMA cycles on behalf of the selected standard I/O device, and direct memory access (DMA) support logic for enabling the DMA cycles to be performed over the peripheral bus. The DMA support logic includes sideband signals directly connecting the DMA controller with the I/O bridge, the sideband signals including information identifying the bus size of the selected I/O device for which the DMA controller is performing the DMA cycles.

19 Claims, 12 Drawing Sheets

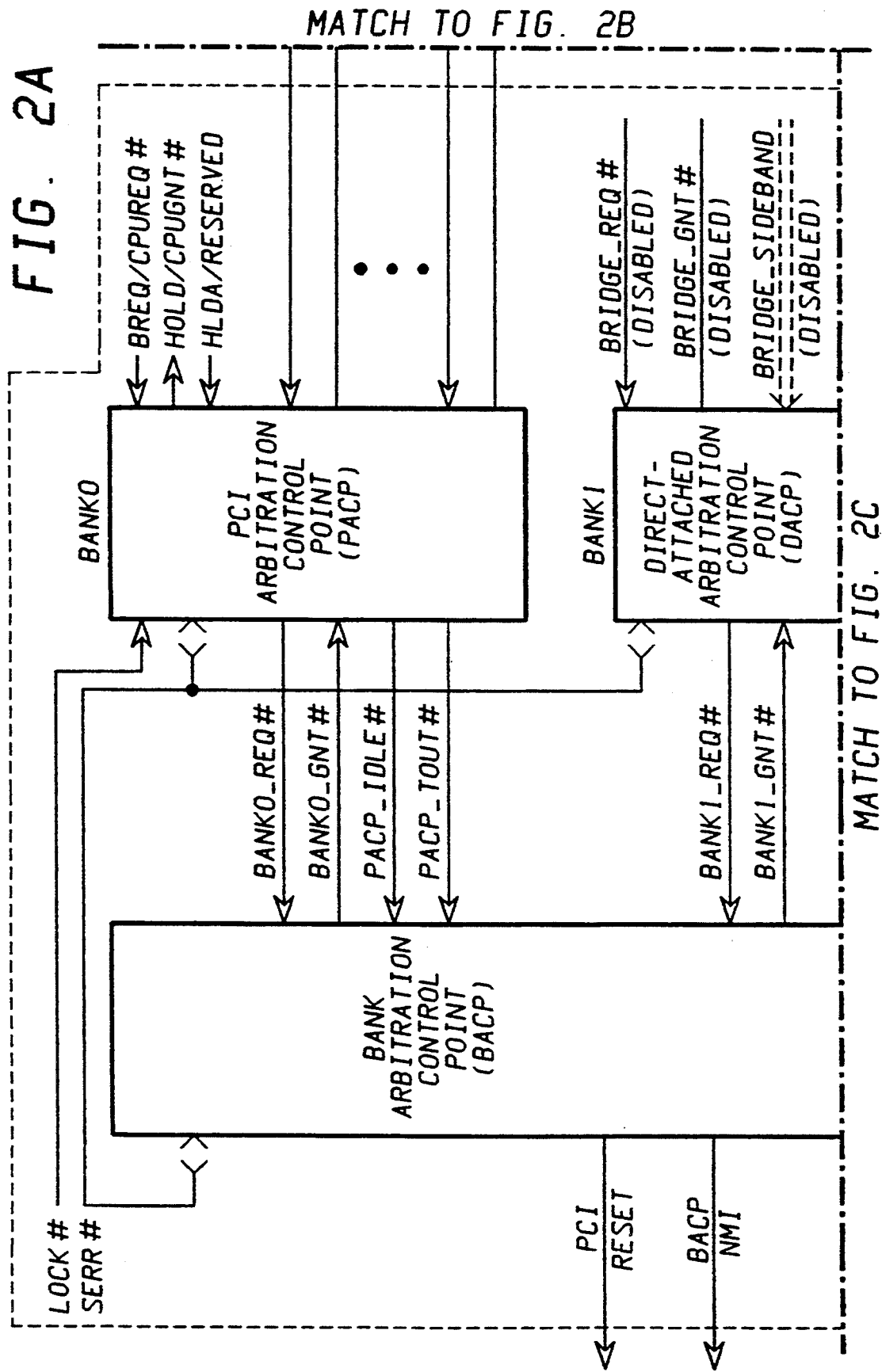

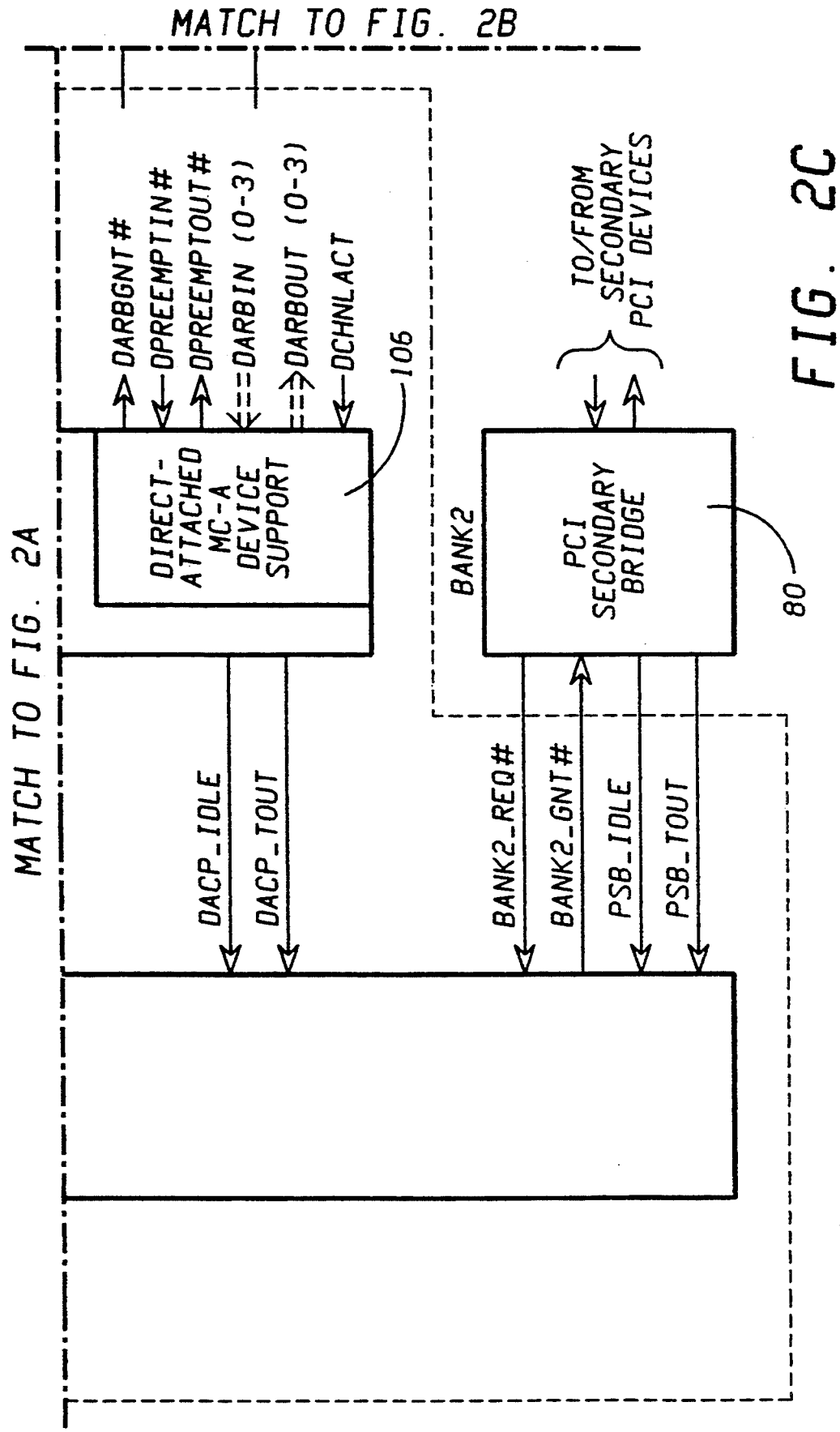

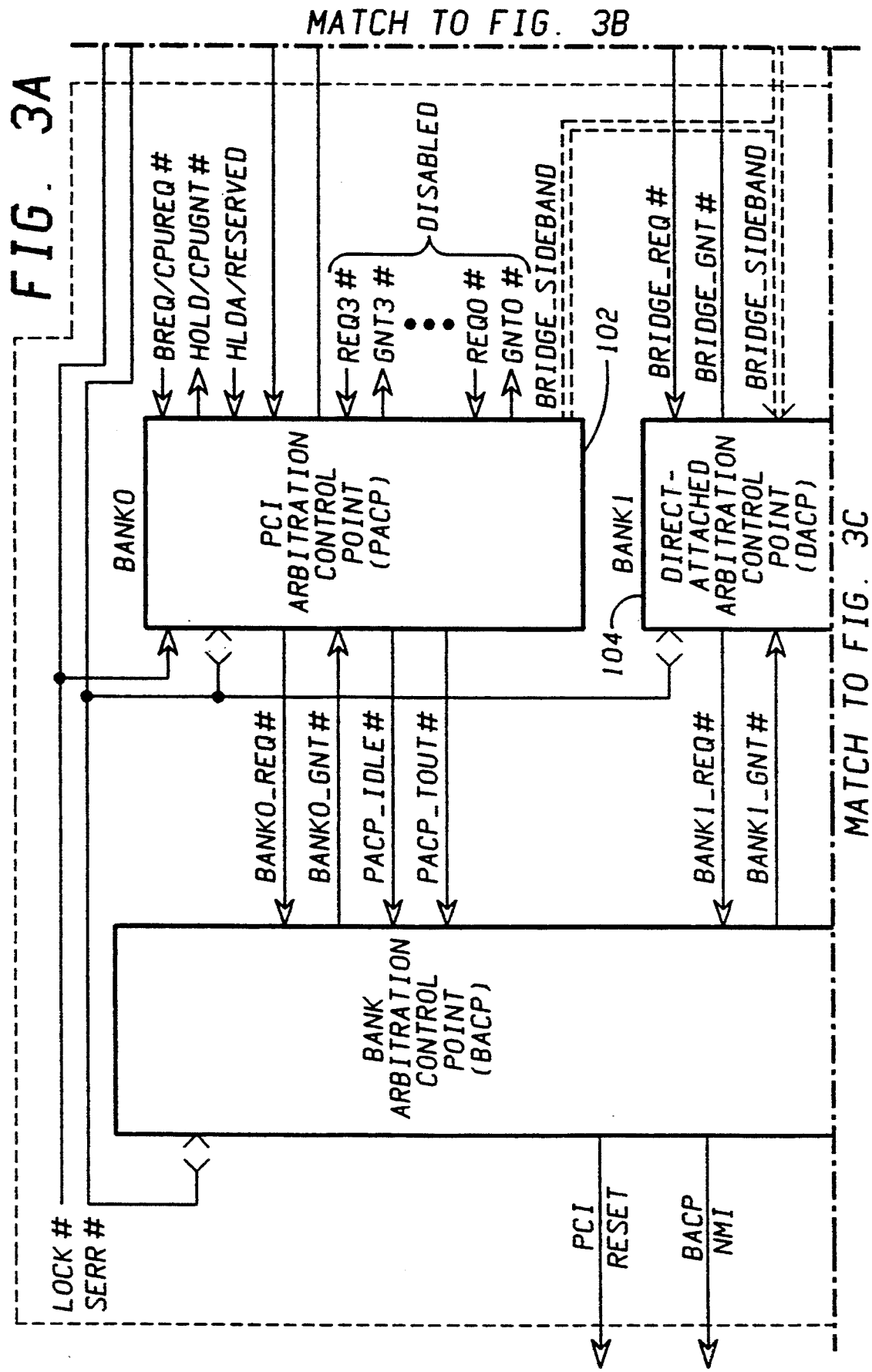

| NO BRIDGE PRESENT | MC-A BRIDGE PRESENT ARB MODE | ISA BRIDGE PRESENT ARB MODE |
|---|---|---|
| REQ4# | PACP2_REQ# | PACP2_REQ# |
| GNT4# | PACP2_GNT# | PACP2_GNT# |
| REQ3# | BRIDGE_REQ# | BRIDGE_REQ# |
| GNT3# | BRIDGE_GNT# | BRIDGE_GNT# |
| REQ2# | ARBID(3) | RESERVED |
| GNT2# | BR_PREEMPT# | SH_REQUEST |
| REQ1# | ARBID(2) | ISA_DACK2 |
| GNT1# | RESERVED | RESERVED |
| REQ0# | ARBID(1) | ISA_DACK1 |
| GNT0# | ARBID(0) | ISA_DACK0 |

FIG. 4A

| NO BRIDGE PRESENT | MC-A BRIDGE PRESENT GRANT MODE | ISA BRIDGE PRESENT GRANT MODE |
|---|---|---|
| REQ4# | PACP2_REQ# | PACP2_REQ# |
| GNT4# | PACP2_GNT# | PACP2_GNT# |
| REQ3# | BRIDGE_REQ# | BRIDGE_REQ# |
| GNT3# | BRIDGE_GNT# | BRIDGE_GNT# |
| REQ2# | BSV# | XMODE1 |
| GNT2# | BR_PREEMPT# | RESERVED |
| REQ1# | BS#8 | XMODE0 |
| GNT1# | DMA ACT# | DMA ACT# |
| REQ0# | BS16# | RESERVED |
| GNT0# | TC# | TC# |

FIG. 4B

| BRIDGE_REQ# | BRIDGE_GNT# | PACP2_REQ# | PACP2_GNT# | ARBIO FUNCTION |
|---|---|---|---|---|
| 1 | 1 | 1 | 1 | MC-A ARBID/ISA DACK |
| 0 | 1 | X | X | MC-A ARBID/ISA DACK |
| 0 | 0 | X | X | DMA SIDEBAND |
| 1 | 0 | X | 1 | DMA SIDEBAND |
| 1 | 1 | 0 | 1 | PACP2 ARBID |
| 1 | 1 | 0 | 0 | PACP2 ARBID |
| 1 | 1 | 1 | 0 | PACP2 ARBID |

FIG. 5

SYSTEM DIRECT MEMORY ACCESS (DMA) SUPPORT LOGIC FOR PCI BASED COMPUTER SYSTEM

RELATED APPLICATIONS

Application Ser. No. 08/069,253 filed May 28, 1993 Entitled "ARBITRATION LOGIC FOR MULTIPLE BUS COMPUTER SYSTEM RELATED APPLICATIONS" (Further identified as Attorney Docket BC9-93-011);

Application Ser. No. 08/069,230 filed May 28, 1993 Entitled "ERROR CAPTURE LOGIC FOR PERIPHERAL BUS IN MULTIPLE BUS COMPUTER SYSTEM" (Further identified as Attorney Docket BC9-93-025);

Application Ser. No. 08/068,882 filed May 28, 1993 Entitled "METHOD AND APPARATUS FOR PROVIDING BACK-TO-BACK DATA TRANSFERS IN AN INFORMATION HANDLING SYSTEM HAVING A MULTIPLEXED BUS" (Further identified as Attorney Docket BC9-93-026);

Application Ser. No. 08/070,134 filed May 28, 1993 Entitled "METHOD AND APPARATUS FOR INITIALIZING MULTIPLE BUS NETWORKS IN AN INFORMATION HANDLING SYSTEM" (Further identified as Attorney Docket BC9-93-012);

Application Ser. No. 08/069,234 filed May 28, 1993 Entitled "METHOD AND APPARATUS FOR PROVIDING ACCURATE AND COMPLETE COMMUNICATION BETWEEN DIFFERENT BUS ARCHITECTURES IN AN INFORMATION HANDLING SYSTEM" (Further identified as Attorney Docket BC9-93-030); and Application Ser. No. 08/068,877 filed May 28, 1993 Entitled "BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS" (Further identified as Attorney Docket BC9-93-031).

BACKGROUND OF THE INVENTION

The present invention relates generally to memory operations occurring in computer systems, and more particularly to logic support for direct memory access (DMA) operations in a computer systems comprising a plurality of buses interconnected by bus bridges. Computer systems typically include more than one bus, each bus in the system having devices attached thereto which communicate locally with each other over the bus. System-wide communication over different buses is required, however, if a device attached to one bus needs to read or write information to or from a device on another bus. To permit system-wide communication between devices on different buses, bus-to-bus bridges (interfaces) are provided to match the communications protocol of one bus with that of another.

Known bus-to-bus bridges include those disclosed in the following co-pending patent applications assigned to the IBM Corporation: Application Ser. No. 07/815,992 entitled "BUS CONTROL LOGIC FOR COMPUTER SYSTEM HAVING DUAL BUS ARCHITECTURE"; U.S. Pat. No. 5,313,627 issued May 17, 1994 entitled "PARITY ERROR DETECTION AND RECOVERY"; Application Ser. No. 07/816,204 entitled "CACHE SNOOPING AND DATA INVALIDATION TECHNIQUE"; U.S. Pat. No. 5,255,374 issued Oct. 19, 1993 entitled "BUS INTERFACE LOGIC FOR COMPUTER SYSTEM HAVING DUAL BUS ARCHITECTURE"; entitled "BI-DIRECTIONAL DATA STORAGE FACILITY FOR BUS INTERFACE UNIT"; Application Ser. No. 07/816,693 entitled "BUS INTERFACE FOR CONTROLLING SPEED OF BUS OPERATION"; U.S. Pat. No. 5,265,211 issued Nov. 23, 1993 entitled "ARBITRATION CONTROL LOGIC FOR COMPUTER SYSTEM HAVING DUAL BUS ARCHITECTURE"; and Application Ser. No. 07/816,698 entitled "METHOD AND APPARATUS FOR DETERMINING ADDRESS LOCATION AT BUS TO BUS INTERFACE", all filed on Jan. 2, 1992. These applications describe mechanisms which permit system-wide communication of devices attached to different buses in the system.

Each bus-to-bus bridge in a multi-bus computer system is used to connect two buses in the system. Various types of buses are available to construct a given computer system. Standard I/O buses include, for example, ISA or MICRO CHANNEL® ("MC-A") buses, which often are used to connect existing peripheral I/O devices to a system built around a more centralized, high performance bus.

One such high performance bus which is becoming widely accepted is the PCI (Peripheral Component Interconnect) bus, which is capable of performing significant data transfer in a relatively short period of time (up to 120 megabytes of data per second). The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as decoders, buffers or latches that are installed intermediate the peripheral devices and the bus.

The primary PCI bus operates on a synchronous clock signal of 33 MHz, and the strings of data transmitted over the PCI bus are 32 bits long. A 32-bit data string on the PCI bus is called a double word (DWORD), which is divided into 4 bytes each comprised of 8 bits of data. The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 2.0 Specification", published Apr. 30, 1993; "Preliminary PCI System Design Guide" revision 0.6, published Nov. 1, 1992, and "Peripheral Component Interconnect (PCI) Add-in Board/Connector Addendum", (Draft) published 6 Nov. 1992; all by the PCI Special Interest Group, the contents of which references are incorporated herein by reference as if they were fully set forth.

Interfacing the PCI bus to standard I/O buses in a computer system is problematic, however, if the communications protocols between the PCI bus and the standard I/O bus are different. For example, direct memory access (DMA) cycles may be handled differently by devices attached to the PCI bus as compared to those connected to a standard I/O bus. DMA cycles are operations in which data is transferred between system memory and input/output units by a DMA controller without intervention by the CPU. Most devices which attach directly to the PCI bus are generally high performance 32-bit bus master devices which have their own built-in DMA control logic. Such bus master devices need not rely on a system-provided DMA controller, thereby permitting the device to initiate a DMA transfer by itself instead of relying on the system DMA controller to initiate data transfers. A DMA slave device is typically lower performance, less expensive and requires the assistance of a system DMA controller to perform a DMA transfer.

Examples of typical DMA slave devices are serial port, parallel port, and floppy disk devices. In order to maintain both hardware and software compatibility with any system which contains a standard I/O bus such an ISA or MC-A bus, it is required that these standard I/O devices, as well as a standard system DMA controller, exist in the system. DMA controllers may be of ISA or PS2 architecture. Although ISA and PS2 DMA controllers are slightly different, they both require specific sets of signals in order to control arbitration and data transfers. A DMA controller is required to maintain compatibility with existing hardware (I/O devices), and ISA/PS2 architecture is required to maintain compatibility with existing software.

DMA controllers have specific functions requiring arbitration, bus sizing, DMA cycles (e.g. transfer timings and terminal count), and various modes (e.g. single/burst/demand/cascade) of operation. The DMA controller is typically located on the standard I/O bus, which precludes systems from being built without a standard I/O bus. The PCI bus does not provide signals or support for a system having a DMA controller located on the PCI bus.

I/O devices on a standard I/O bus are likely to be less performance-oriented than devices attached to the PCI bus and more likely to require the assistance of a DMA controller to perform DMA cycles (e.g., 8, 16 or 32-bit I/O devices having no DMA controller built-in). A DMA controller requires dynamic bus sizing when managing DMA cycles for different types of slave devices, meaning that it needs to know the size (8-bit, 16-bit, etc.) of the particular slave device on whose behalf it is managing a DMA cycle. Such dynamic bus sizing is typically supported on standard I/O buses, such as the AT®, ISA or MICROCHANNEL® buses.

Because the PCI bus was not architected with such dynamic bus sizing capability, however, the PCI bus cannot support DMA cycle operations involving DMA slave devices. DMA slave devices which are attached to a standard I/O bridge which is in turn connected to a PCI bus, then, cannot have DMA operations performed on their behalf by a DMA controller over the PCI bus. Such operations are necessary, however, if the multi-bus system architecture requires DMA slave devices on the standard I/O bus to cross over the PCI bus to access system memory.

It is an object of the present invention, then, to provide a mechanism for supporting DMA cycles for DMA slave devices on a standard I/O bus which is attached to a high performance bus (such as a PCI bus) by means of a standard bus bridge, in order to permit a DMA controller to perform DMA cycles on behalf of the slave devices over the PCI bus to system memory. The mechanism is provided by defining a sideband interface to a standard I/O bridge which allows a system DMA controller to always exist on the PCI bus. By utilizing the sideband interface, DMA slave devices on an optional expansion bus can also be supported. In addition, the DMA specific sideband signals may be multiplexed with existing sideband signals.

SUMMARY OF THE INVENTION

The present invention solves the problem of supporting DMA cycles on behalf of slave I/O devices over the PCI bus. The invention defines an extension to the PCI bus comprising sideband signals which provide the necessary link between a DMA controller and a standard DMA-compatible expansion bus. Some of the sideband signals are multiplexed with arbitration signals to reduce the pin count necessary to implement DMA cycle support on the PCI bus.

To manage I/O cycles on behalf of an I/O device over the PCI bus, the DMA controller must determine the bus size of the I/O device for which it is managing an I/O cycle (i.e. whether the device is an 8, 16 or 32-bit device). This information is provided by the multiplexed sideband signals. The sideband signals directly connect between the DMA controller and an I/O bridge which supports a DMA-compatible expansion bus.

BRIEF DESCRIPTION OF THE DRAWINGS

FIGS. 2A through 2C are [FIG. 2 is] a block diagram of one embodiment of the system arbitration control point shown in the system of FIGS. 1A through 1C [FIG. 1];

FIGS. 3A through 3D are [FIG. 3 is] a block diagram of another embodiment of the system arbitration control point shown in the system of FIGS. 1A through 1C [FIG. 1];

FIG. 4A is a table showing alternate definitions of inputs into the system arbitration control point during an arbitration mode which correspond to the embodiments shown in FIGS. 2A through 2C and FIGS. 3A through 3D; [FIGS. 2 and 3; and]

FIG. 4B is a table showing alternate definitions of inputs into the system arbitration control point during a grant mode which correspond to the embodiments shown in FIGS. 2A through 2C and FIGS. 3A through 3D; and [FIGS. 2 and 3.]

FIG. 5 is a table showing multiplexed arbitration sideband signals.

DETAILED DESCRIPTION OF THE PREFERRED EMBODIMENT

Figure 1A:
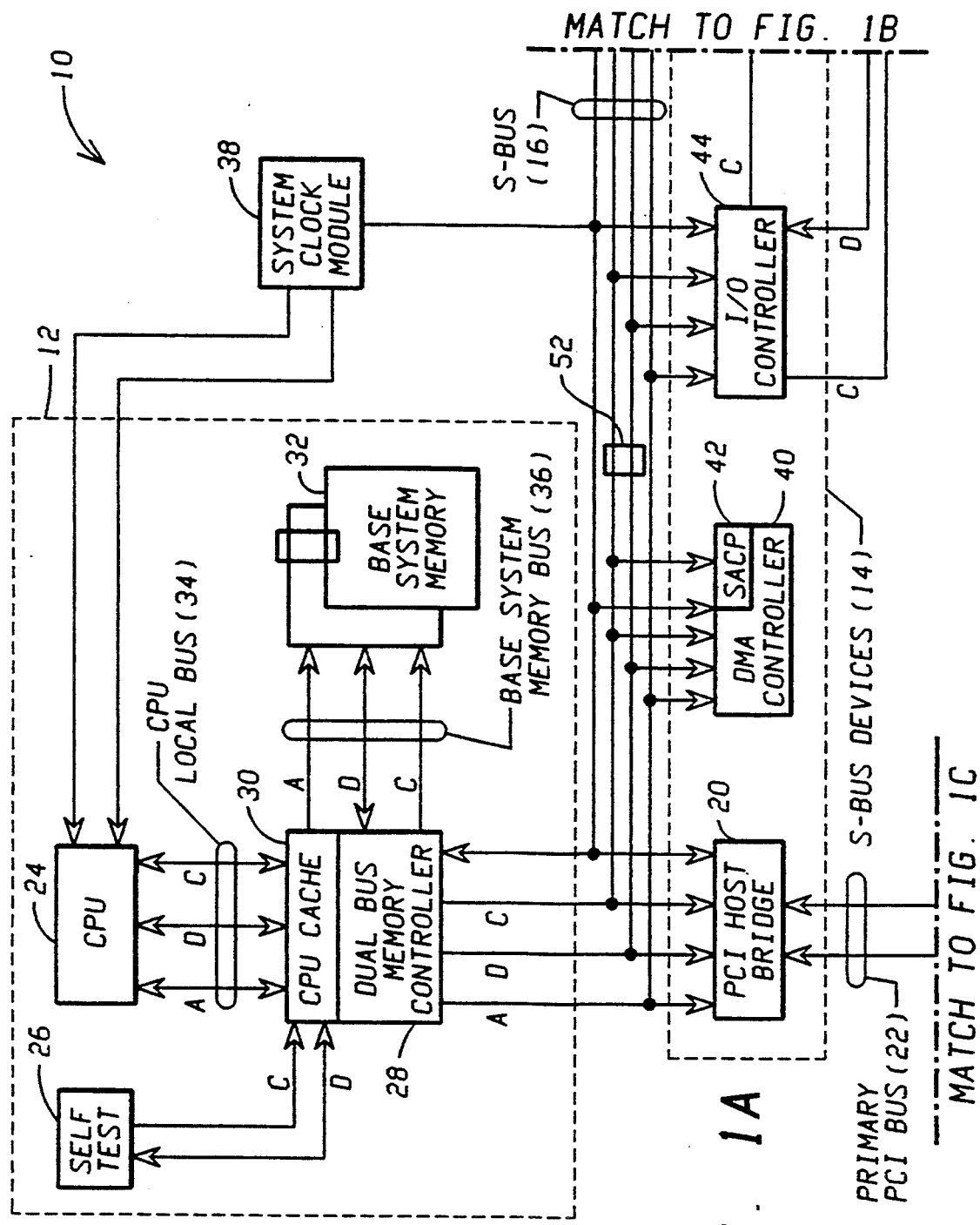
FIGS. 1A through 1C, taken together, are [FIG. 1] is a block diagram of an information handling system constructed according to the principles of the present invention.
Figure 1B:
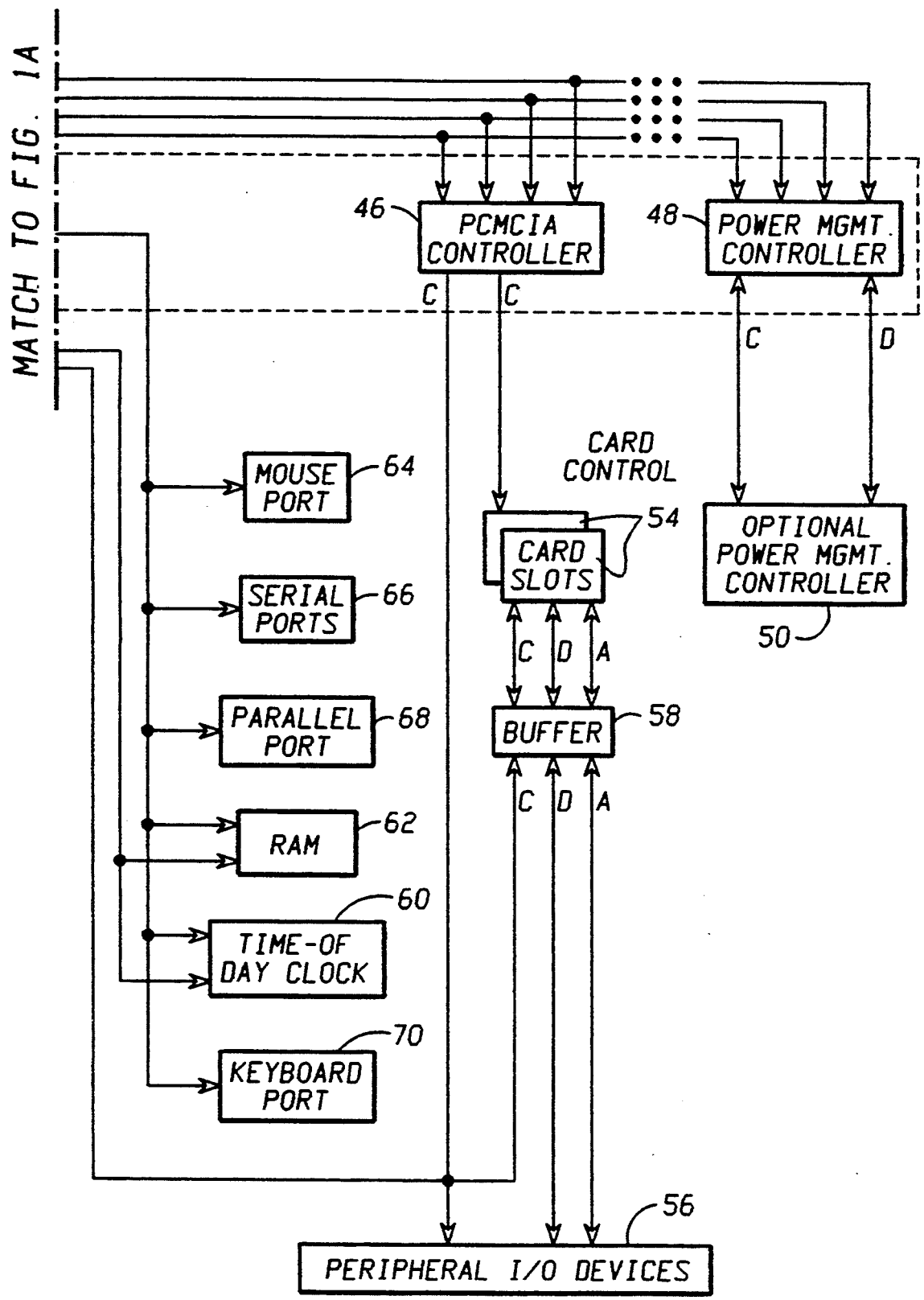
Figure 1C:
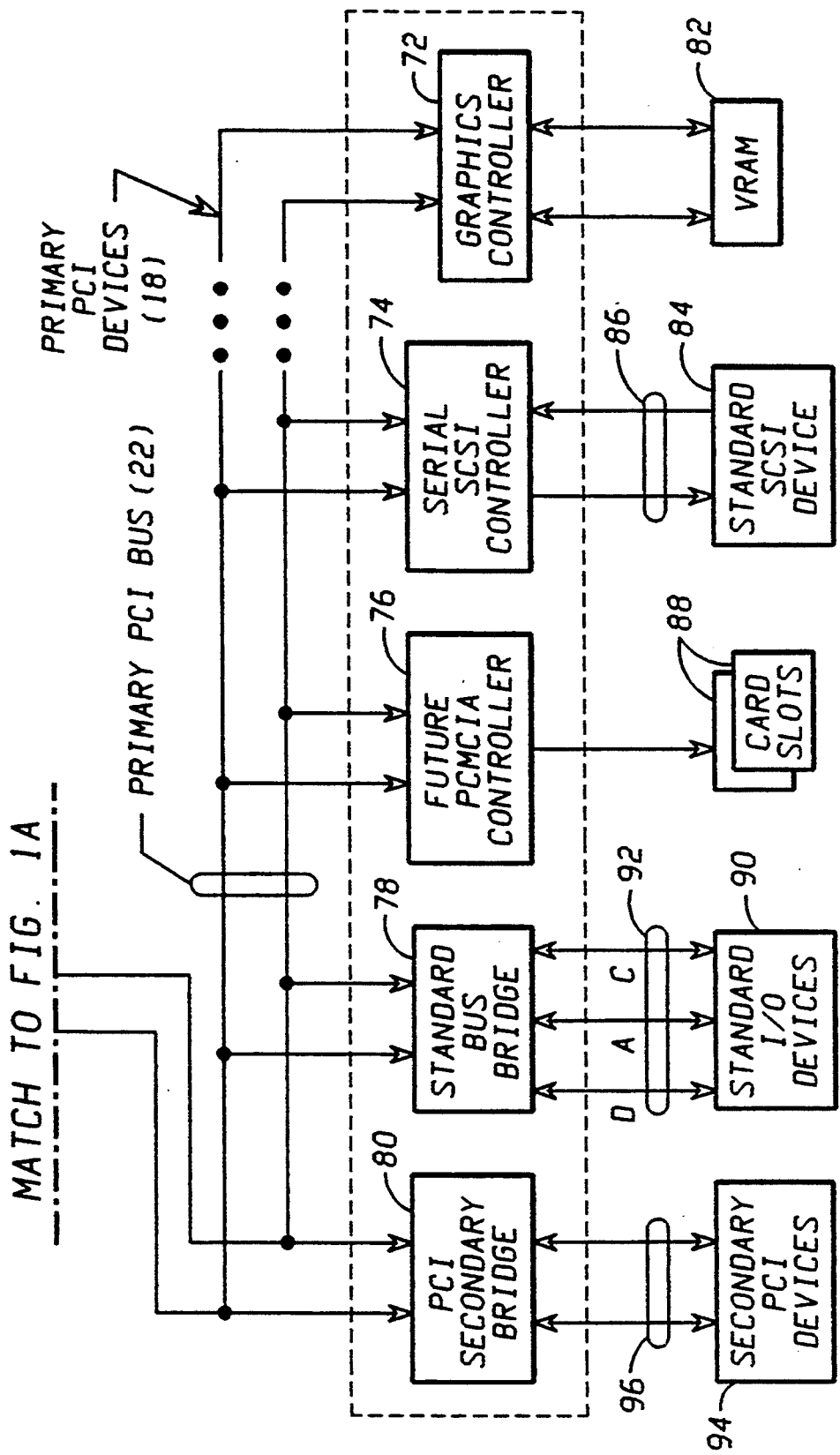

Referring now to FIGS. 1A–1C, a multi-bus information handling system 10 is shown generally at 10, comprising, (i) a processor, cache and memory complex 12 connected to S-bus (system bus) devices 14 via an S-bus 16 and (ii) primary PCI devices 18 attached to one of the S-bus devices, a primary PCI host bridge 20, via a primary PCI bus 22. More detailed descriptions of the processor, cache and memory complex 12, the S-bus devices 14, the primary PCI devices 18, and the other elements shown in FIGS. 1A–1C will be provided hereinafter.

The processor, cache and memory complex 12 comprises a central processing unit (CPU) 24, a self-test circuit 26, a memory controller 28, a CPU cache 30, and base system memory 32. The CPU 24 in the preferred embodiment is a 32-bit microprocessor available from Intel, Inc. under the trade designation i486™, although it is contemplated that the system 10 may be implemented using other types of CPUs, especially other x86-type microprocessors. The self-test circuit 26 provides a built-in-self-test (BIST) feature for the CPU 24 upon power-up. The self-test circuit also controls any self-test features which may be incorporated within each of the S-bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by an S-bus device 14 over the S-bus 16. Because the memory controller has the capability to manage operations on two buses, operations over the base system memory bus 36 and the CPU local bus 34 may be managed simultaneously. The CPU local bus 34, the base system memory bus 36, and the S-bus are 32-bit buses, each of which buses comprises data, address and control information paths ("D", "A", and "C" in FIGS. 1A–1C) as is typical of such buses.

Base system memory 32 provides system-wide storage capability and may comprise either non-interleaved or interleaved memory cards. The CPU cache 30 permits short term storage of information contained within either base system memory 32 or expansion memory located elsewhere within the system 10. Such expansion memory could, for example, be located on the peripherally attached I/O devices within the system. The CPU cache 30 incorporates random access memory (RAM, not shown) which is used to temporarily stores address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the S-bus devices 14 has access to the base system memory via the memory controller 28. During a memory cycle, the memory controller does not pass information onto the S-bus. However, if the memory controller determines that the operation it is managing is an I/O cycle, the memory controller propagates the information onto the S-bus for access thereto by an S-bus device. If the I/O cycle is destined for a S-bus device, the appropriate S-bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the S-bus devices 14, and a pair of clock signals for the CPU 24. In the preferred embodiment, the clock signal provided to the S-bus operates at 33 MHz. The two signals provided to the CPU 24 operate at 33 MHz and 66 MHz, respectively. The CPU 24 requires two clock signals because it operates internally at 66 MHz, but communicates over the CPU local bus 34 at 33 MHz.

Communications between the processor, cache and memory complex 12 and the S-bus devices are managed by the memory controller 28 over the 32-bit S-bus 16. Also attached to the S-bus, as shown in the preferred embodiment of FIGS. 1A–1C, are a direct memory access (DMA) controller 40, a system arbitration control point (SACP) 42, an input/output (I/O) controller 44, a PCMCIA controller 46, and a power management controller 48. An optional power management controller 50 may be attached to the power management controller 48 in case more sophisticated power management control is desired. A buffer 52 is provided on the S-bus 16 intermediate the DMA controller 40 and the I/O controller 44. As shown in FIGS. 1A–1C, however, it is contemplated that other S-bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. The peripheral I/O devices 56 are controlled by the I/O controller 44. Attached to the I/O controller are a time-of-day clock 60 and a RAM module 62. The I/O controller 44 supports a variety of ports, including a mouse port 64, serial ports 66, a parallel port 68, and a keyboard port 70.

In addition to supporting S-bus devices 14 on the S-bus 16, the system 10 also supports a second high speed, high bandwidth bus, which in the preferred embodiment is the primary PCI bus 22. Primary PCI devices 18 in the system 10 communicate with each other over the primary PCI bus 22. Primary PCI devices communicate with the CPU, cache and memory complex 12 and with other S-bus devices 14 residing on the S-bus 16 by means of the PCI host bridge 20, which is itself an S-bus device residing on the S-bus. The PCI host bridge 20, then, serves as an interface between the S-bus 16 and the primary PCI bus 22 and provides an effective means of communication between these two buses, and any peripheral devices which may be attached to these buses.

The PCI host bridge 20 is a low latency interconnect mechanism through which the CPU 24 or other S-bus device 14 may directly access the primary PCI devices 18 or devices attached thereto. The bridge 20 also provides a high performance path which allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses.

The primary PCI bus 22 is capable of supporting a variety of devices which are PCI compatible. As shown in FIGS. 1A–1C, these devices may include a graphics controller 72, a serial SCSI (small computer systems interface) controller 74, a future PCMCIA controller 76, a standard I/O bus (e.g., ISA or MICRO CHANNEL ® ("MC-A")) bridge 78 (also referred to herein as an expansion bridge), and a PCI secondary bridge 80. The devices shown in FIGS. 1A–1C attached to the primary PCI bus, however, are only one example of a system implementing a PCI bus architecture and thus the disclosed exemplary configuration and is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., MC-A or ISA) bus 92 and the primary PCI bus 22. Secondary PCI devices 94 are connected to PCI secondary bridge 80 via secondary PCI bus 96. Any number of unidentified secondary PCI devices 94 may then be connected to the secondary PCI bus 96. The PCI secondary bridge 80 serves as an interface between the secondary PCI devices 94 attached to the secondary PCI bus 96, and the primary PCI bus 22.

The DMA controller 40, the PCI host bridge 20, and the I/O controller 44 control the exchange of information between base system memory 32 and expansion memory on the peripheral I/O devices 56 or on the standard I/O devices 90. The DMA controller 40 also provides three functions on behalf of the CPU, cache and memory complex 12. First, the DMA controller 48 utilizes a small computer subsystem control block (SCB) architecture to configure DMA channels, thus avoiding the necessity of using programmed I/O to configure the DMA channels. Second, the DMA controller provides a buffering function to optimize transfers between slow memory expansion devices and the typically faster base system memory 32. Third, the DMA controller provides an eight channel, 32-bit, direct base system memory access function. When providing the direct base system memory access function, the DMA controller 40 may function in either of two modes. In a first mode of operation, the DMA controller functions in a programmed I/O mode in which the DMA controller is functionally a slave to the CPU 24. In a second mode of operation, the DMA controller itself functions a master on the S-bus.

The DMA controller 40 always functions as a third party bus master. It is never a source or destination of data, but it does provide a means for transferring data between a source entity and a destination entity. Although shown residing on the S-bus in FIGS. 1A–1C, the DMA controller need not reside on the S-bus. The DMA controller typically manages data transactions from memory to an I/O device, or from an I/O device to memory. The memory may be either base system memory 32 or peripheral memory on the peripheral I/O devices 56 or on the standard I/O devices 90.

The standard I/O devices 90 residing on the standard (e.g., ISA or MC-A) bus 92 may be 8-bit type devices, 16-bit type devices, or 32-bit type devices. The design of the PCI host bridge 20 and the system arbitration control point (SACP) 42 according to the present invention permits simultaneous arbitration on a system-wide basis of (i) the CPU 24, (ii) primary PCI devices 18 residing on the primary PCI bus 22, (iii) standard I/O devices 90 residing on the standard I/O bus 92, and (iv) peripheral I/O devices 56 controlled by the I/O controller 44. The SACP 42 functions as the primary arbiter for the standard I/O devices 90, the CPU 24, the primary PCI devices 18, and the peripheral I/O devices 56.

Figure 2B:
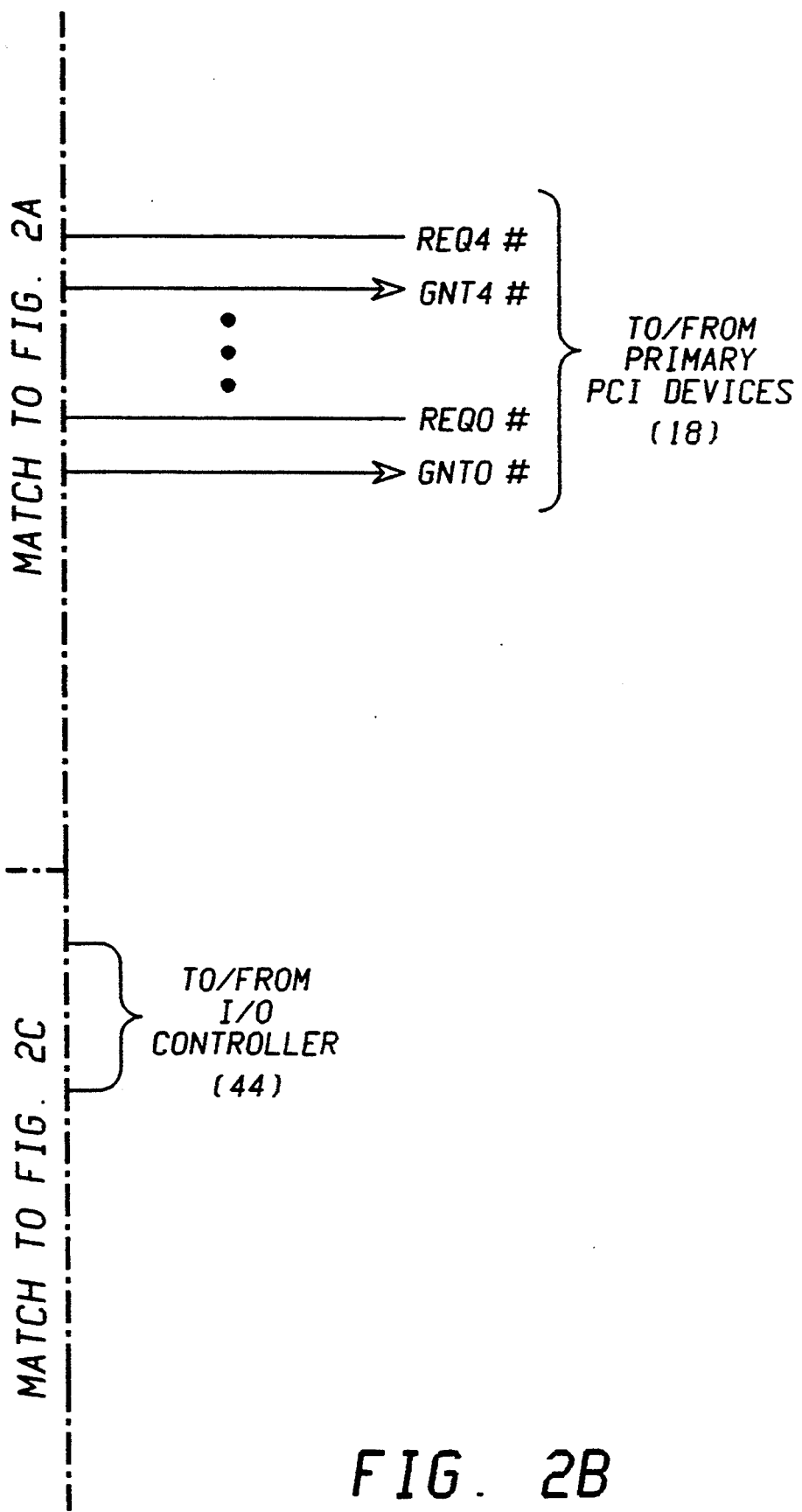
Figure 3B:
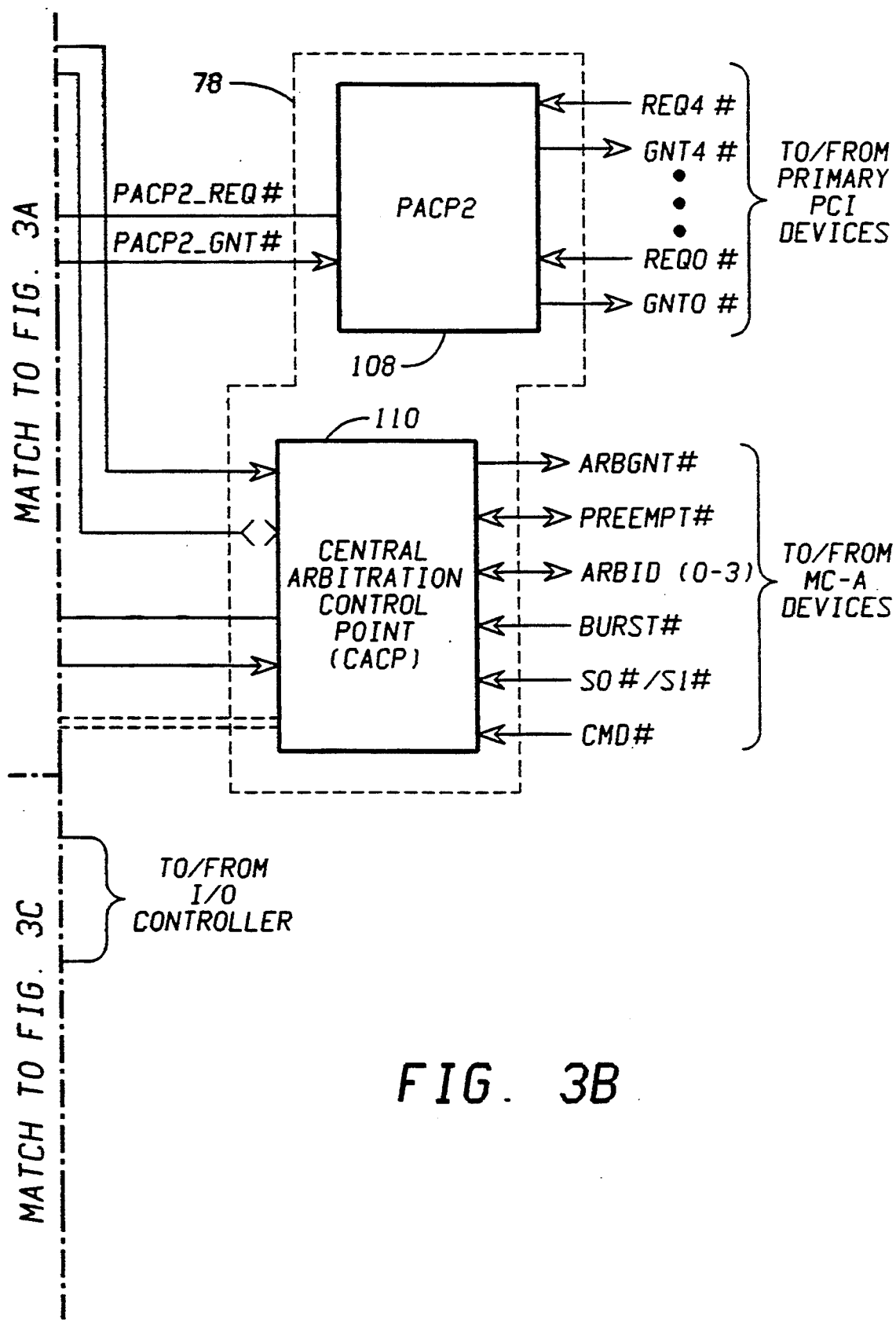
Figure 3C:
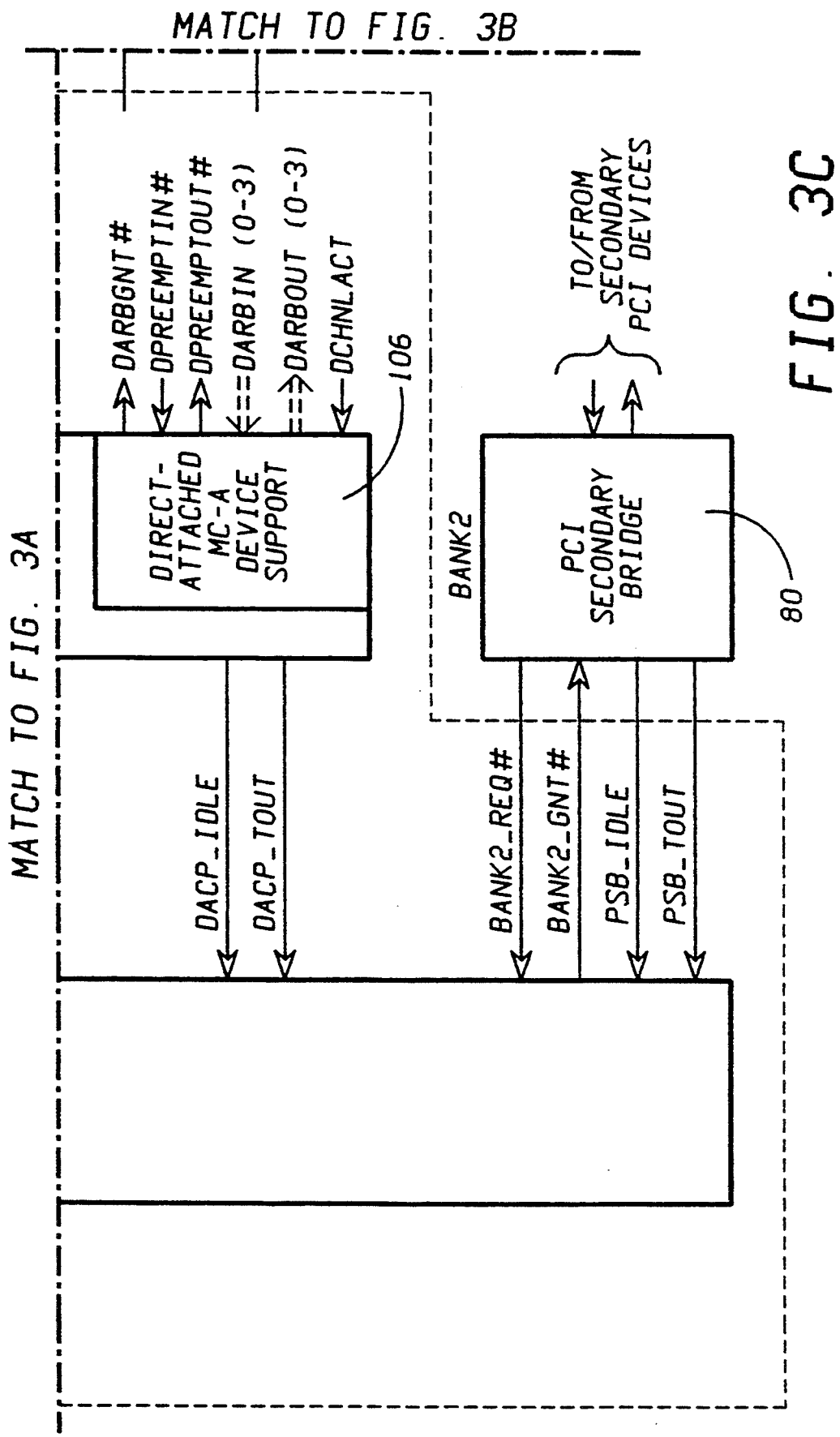
Figure 3D:
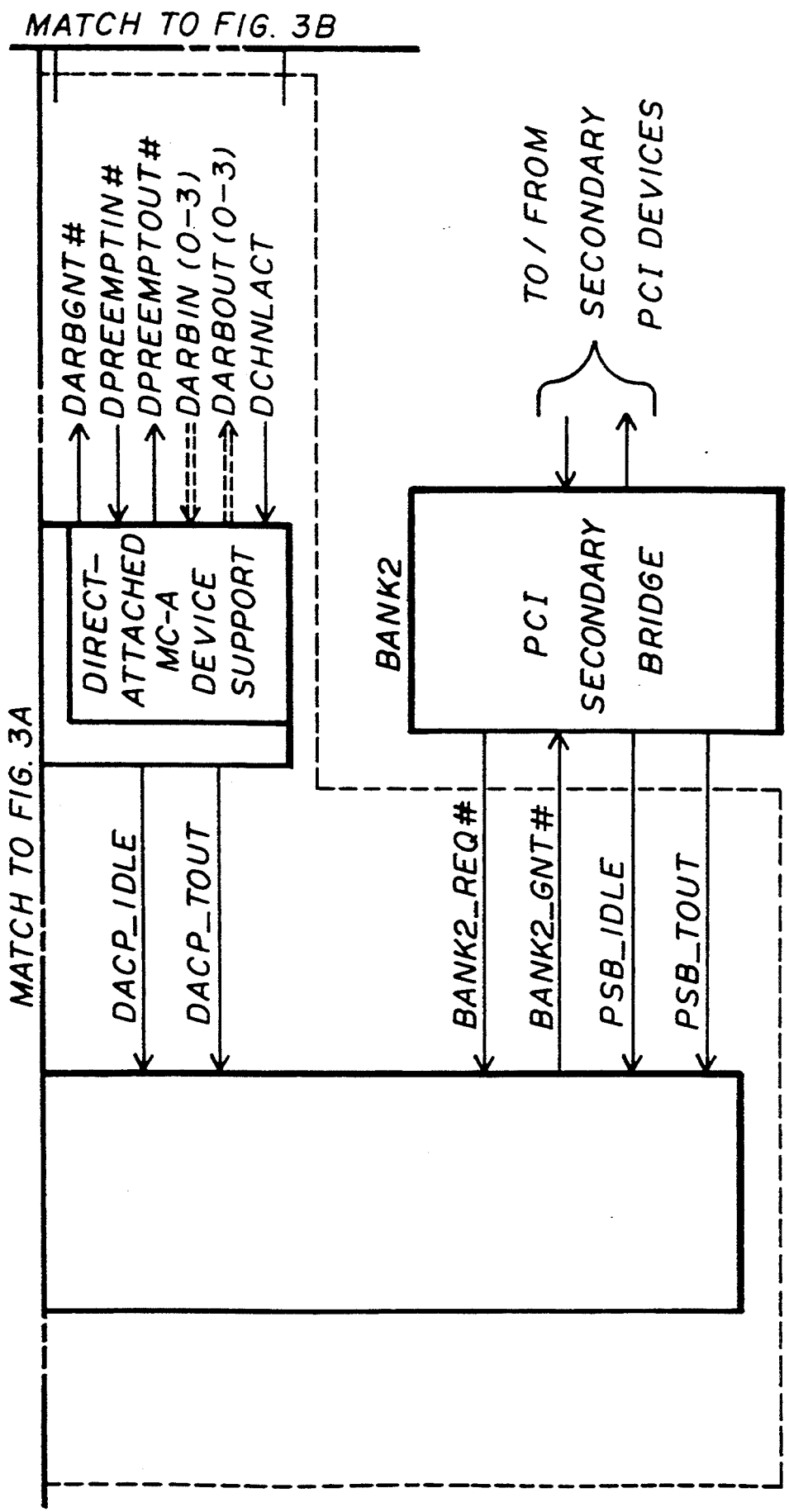

Block diagrams of implementations of the SACP 42 are shown in FIGS. 2A–2C and 3A–3D. FIGS. 2A–2C is a block diagram of an embodiment of the system arbitration control point used when the system shown in FIGS. 1A–1C does not include a standard bus bridge 78 attached to the primary PCI bus 22. FIGS. 3A–3D is a block diagram of a second embodiment of the system arbitration control point used when the system shown in FIGS. 1A–1C includes a standard bus bridge 78 attached to the primary PCI bus 22.

Referring first to FIGS. 2A–2C, the SACP 42 implementation used when no standard bus bridge 78 is present comprises a bank arbitration control point (BACP) 100, a PCI arbitration control point (PACP) 102, and a direct-attached arbitration control point (DACP) 104. The BACP 100 arbitrates between requests by the PACP 102 and the DACP 104 for control of the primary PCI bus 22. The PACP 102 manages primary PCI bus access requests presented to it by the CPU 24 and the primary PCI devices 18 (collectively "BANK0 requests"). The DACP 104 handles primary PCI bus requests presented to it by the I/O controller 44 on behalf of the peripheral I/O devices 56 which it controls. As will be explained later with reference to FIGS. 3A–3D, the DACP 104 also manages primary PCI bus access requests presented by the standard bus bridge 78 on behalf of standard I/O devices 90 attached thereto, in systems including a standard bus bridge 78 attached to the primary PCI bus 22.

The primary PCI bus requests presented by the standard bus bridge 78 and the I/O controller 44 are collectively referred to herein as "BANK1 requests". The BACP 100, in addition to managing primary PCI bus access requests presented by the PACP 102 and the DACP 104, is adapted to handle primary PCI bus requests by the PCI secondary bridge 80 on behalf of secondary PCI devices attached thereto (collectively "BANK2 requests"). Further expansion to include bank arbiters other than those shown in FIGS. 2A–2C and 3A–3D (the PACP 102, the DACP 104 and the PCI secondary bridge 80) is contemplated by the present invention. If other secondary PCI bridges are included in the system in a multi-tier structure attached to the PCI bus 22, these other secondary PCI bridges will themselves perform arbitration among attached devices and present a "BANKN" request to the BACP 100.

The hierarchical architecture described above provides an arbitration scheme for the system 10 wherein (i) arbitration between the CPU and primary PCI devices is managed independently of (ii) arbitration between peripheral I/O devices controlled by the I/O controller and standard I/O devices attached to the standard bus bridge 78 (when present). The PACP 102 receives requests for access to the PCI bus 22 directly from up to five PCI devices 18 and the CPU 24. The five PCI devices present their requests to ten request/grant lines on the PACP, REQ0# through REQ4# (as used herein, the symbol "#" is used to denote negative active signals). The PCI devices are granted access to the primary PCI bus 22 via grant lines GNT0# through GNT4#. The request lines and grant lines are direct connections between the primary PCI devices 18 and the PACP 102.

Although the CPU 24 accesses base system memory via the memory controller 28, if the CPU requires access to the primary PCI bus 22, it must compete with like requests made by the primary PCI devices 18. Once the CPU 24 gains control of the S-bus 16, the primary host bridge will provide a bus master interface between the primary PCI bus and the S-bus, and will present the CPU 24 as a PCI master. Although the PCI host bridge performs no arbitration, it does perform protocol conversion, buffering, and speed matching between the S-bus and the PCI bus.

The primary PCI bus access request for the CPU 24 is presented directly to the PACP 102 on the request line BREQ which is used as a preempt signal (typical of i486-type processors) to the PACP. The CPU 24 uses a hold/hold acknowledge protocol via dedicated lines HOLD and HLDA between the CPU 24 and the PACP 102. In embodiments of the system wherein the CPU is not of the i486 architecture, the PACP-CPU interface is unknown and thus the PACP must also support a PCI request/grant handshake (CPUREQ# and CPUGNT#) in addition to the i486 BREQ/HOLD/HLDA. Accordingly, both the CPU and the PCI devices each have direct connections for arbitration request and grant signals to and from the PACP 102.

The pending requests between the primary PCI devices 18 and the CPU 24 may be handled by the PACP 102 in two different manners. One approach is to handle the requests in a round robin procedure, wherein the PACP would service the pending requests in sequential order. A second approach is to manage the requests in a fixed priority. This second approach is possible if an arbitration priority is assigned to each of the primary PCI devices 18 and the CPU 24. Specifically, the CPU request line BREQ/CPUREQ# and the primary PCI device request lines REQ0#-REQ4# have programmable priority levels. The priority levels may be determined based on the bandwidths of the PCI devices involved. For example, a PCI device possessing a high bandwidth and low buffering capability should be assigned a higher arbitration priority than devices having smaller bandwidths and/or higher buffering capability.

Regardless of the approach taken, the PACP 102 arbitrates among the BANK0 requests, determines which of the PCI devices or the CPU should maintain a priority, and presents the selected device to the BACP on BANK0_REQ# line, along with the requests presented by the other bank arbiters (BANK1_REQ#, BANK2_REQ#, etc.). The BACP 104 is programmed to provide each of the bank arbiters with a selected time interval in which devices selected by the bank arbiters are granted access to the primary PCI bus 22. Access to the primary PCI bus 22 is granted to the selected device via grant lines output by the BACP (BANK0_GNT#, BANK1_GNT#, BANK2_GNT#, etc.)

As explained above, the BACP 100 is the highest level arbiter in the SACP 42. It services arbitration requests presented to it by the individual bank arbiters which manage primary PCI bus access requests on a system-wide basis. The operation of the first bank arbiter, PACP 102 (BANK0), has been described above. A description of the operation of the second bank arbiter, DACP 104 (BANK1), follows.

The DACP 104 is responsible for arbitrating between peripheral I/O devices 56 controlled by the I/O controller 44 (in embodiments of the system wherein no standard bus bridge 78 is used) or between peripheral I/O devices 56 and standard I/O devices 90 attached to the standard bus bridge 78 when one is included in the system. The peripheral I/O devices 56 and the peripheral I/O devices 90 may be compatible with either MICROCHANNEL® (MC-A) or ISA architecture. As shown in FIGS. 2A-2C and 3A-3D, the control signals to which the DACP 104 responds correspond to MC-A architecture, although the DACP may be implemented to respond to ISA-type control signals.

With continued reference to FIGS. 2A-2C (no standard bus bridge 78 present), the DACP 104 receives primary PCI bus access requests from the I/O controller 44 on behalf of the peripheral I/O devices 56 at a portion of the DACP designated direct-attached MC-A device support 106. These requests are made over the DPREEMPTIN# line. The direct-attached MC-A device support portion 106 of the DACP 104 alternates between arbitration and grant cycles in performing arbitration between peripheral I/O devices 56 competing for access to the primary PCI bus 22. The status of the DARBGNT# line indicates whether the direct-attached MC-A device support portion 106 is in an arbitration or a grant cycle. Bus access requests are managed over the DPREEMPTOUT# line. The DPREEMPTOUT# output and DPREEMPTIN# input conform to MC-A protocol. The other signal lines in and out of the direct-attached MC-A device support portion 106 will be described in the context of FIGS. 3A-3D. The BRIDGE_REQ#, BRIDGE_GNT#, and BRIDGE_SIDEBAND signal lines to and from the DACP 104 in FIGS. 2A-2C are disabled because no standard bus bridge 78 is present.

In FIGS. 3A-3D, however, the system 10 includes a standard bus (expansion) bridge 78 connected to the primary PCI bus 22. In this embodiment, the DACP 104 arbitrates between peripheral I/O devices 56 controlled by the I/O controller 44 and standard I/O devices 90 attached to the standard I/O bus 92 supported by the standard bus bridge 78, each of which devices compete for access to the primary PCI bus 22. As explained above, the peripheral I/O devices 56 and the standard I/O devices 90 are either MC-A or ISA-compatible.

Five request/grant pairs REQ0#/GNT0# through REQ4#/GNT4# are still used by primary PCI devices 18 to request and be granted access to the PCI bus 22. However, these request/grant lines are directed into a secondary PCI arbitration control point, PACP2 108, and not the PACP 102. The PACP2 108 is located physically within the standard bus bridge 78, and is cascaded into the PACP 102. PACP2 108 arbitrates between the attached primary PCI devices 18 and presents a single bus access request PACP2_REQ# to the primary PACP 102. Arbitration priorities are handled in a similar manner to that in which they are managed in the PACP 102. The PACP then arbitrates between the CPU 24 (the bus access request of which is presented on the BREQ/CPUREQ# line) and the highest priority PCI device (the bus access request of which is presented on the PACP2_REQ# line). The primary PCI devices have their request for PCI bus access granted over the PACP2_GNT# line.

Because arbitration among PCI devices is handled outside the SACP 42 in the embodiment of FIGS. 3A–3D, the functions of the request/grant lines in and out of the SACP are redefined for the system of FIGS. 3A–3D. FIG. 4 is a table showing alternate definitions of pin connections into the SACP 42 corresponding to the embodiments shown in FIGS. 2A–2C and 3A–3D. The five pairs of request/grant lines REQ0# and GNT0# through REQ4# and GNT4#, which are used by the primary PCI devices to request and be granted access to the PCI bus 22 in the system not having a standard bus bridge 78 attached to the primary PCI bus (FIGS. 2A–2C), are redefined when the system does include a standard bus bridge 78 (FIGS. 3A–3D). Because PACP2 108 handles the primary PCI device bus access requests outside the SACP 42 and presents a single request to the PACP 102, REQ4# is redefined as the single request PACP2_REQ#. Similarly, GNT4# is redefined as a single grant line from the PACP to the PACP2 as PACP2_GNT#. REQ0#/GNT0# through REQ3#/GNT3# lines into and out of the PACP 102 are disabled.

With eight input/output lines (REQ0#/GNT0# through REQ3#/GNT3#) disabled in the system of FIGS. 3A—3D, eight new pin connections are available as inputs to the SACP 42, having been freed up by the addition of PACP2. These input/output lines are required for the system of FIGS. 3A–3D to permit arbitration of standard I/O devices 90 concurrently with peripheral I/O devices 56. As shown in FIGS. 3A–3D, a central arbitration control point CACP 110, physically located on the MC-A bridge 78, manages the arbitration of MC-A devices 90. (In the case of ISA devices, arbitration of such devices would be handled by an ISA-compatible arbitration device, via ISA_DREQ# and ISA_DACK# lines, because the ISA protocol supports direct requests and acknowledges to and from the devices attached to the ISA-compatible arbitration device.)

A MC-A device requests arbitration by activating the PREEMPT# signal into the CACP 110. The CACP alternates between arbitration and grant cycles which are indicated by the state of the ARBGNT# line. When the PREEMPT# signal is activated, the CACP enters the arbitration state during which the MC-A devices drive their arbitration identification outputs (ARBID(0-3)). After 300 nanoseconds, the arbitration identification of the highest priority MC-A device remains on the ARBID(0-3) lines. This single request is presented on the BRIDGE_REQ# signal line to the DACP 104. The DACP, if having determined that the request presented by the CACP has priority over a request presented by the I/O controller 44 on behalf of the peripheral I/O devices 56, will activate the BRIDGE_GNT# signal line. (As shown in FIG. 4, the REQ3#/GNT3# lines are redefined as the BRIDGE_REQ# and BRIDGE_GNT# signal lines, disabled in the system corresponding to FIGS. 2A–2C, into and out of the DACP 104). If an expansion bridge 78 is included within the system, the BRIDGE_REQ# signal is used as a request on behalf of an expansion bus master or a DMA slave during the arbitration cycle, as a BURST# signal during DMA grant cycles, and as an indication of the end of transfer during cascade/bus master operation. The BRIDGE_GNT# signal indicates to the MC-A devices 90 when the DACP 104 grants access to the PCI bus 22. The ARBGNT# line enters the grant state and the highest priority MC-A device determines that it has been selected and that its bus access request has been granted. Operation of the CACP 110 is explained more fully in co-pending applications Ser. No. 07/777,777 filed Oct. 15, 1991 and entitled "Controlling Bus Allocation Using Arbitration Hold" and Ser. No. 07/816,116 filed Jan. 2, 1992 for "Arbitration Control Logic for Computer System having Dual Bus Architecture", the texts of which are incorporated herein by reference.

The six remaining inputs into the SACP 42, REQ0#/GNT0# through REQ2#/GNT2#, are redefined as the six BRIDGE_SIDEBAND signals (disabled in the system corresponding to FIGS. 2A–2C). BRIDGE_SIDEBAND signals are not defined in the PCI architectural specification but are required to support arbitration as well as DMA peripherals on the PCI bus, such as the standard I/O devices 90 attached to the standard bus bridge 78, to provide an effective PCI-ISA or PCI-MC-A interface. The BRIDGE_SIDEBAND lines directly connect the standard bus bridge 78 with the SACP 42. With reference to FIG. 4, these BRIDGE_SIDEBAND signals have different definitions, depending on whether the standard bus bridge 78 is MC-A or ISA-compatible. When the bridge is not granted, the six sidebands include the identification information (ARBID(0) through ARBID(3) in MC-A; ISA_DACK(0) through ISA_DACK(2) in ISA) which identifies the I/O device presenting the PCI bus access request.

With reference to the MC-A implementation of the present invention, using the ARBID(0) through ARBID(3), the BRIDGE_SIDEBAND signal lines are used to convey identification information to the SACP 42 relating to the primary PCI devices 18 and the MC-A devices 90 requesting access to the PCI bus 22. The status of these four lines indicates to the PACP 102 which primary PCI device 18 won the initial arbitration process managed by the PACP2 108, and further indicates to the DACP 104 which MC-A device 90 won the initial arbitration process managed by the CACP 110. By providing information identifying the primary PCI devices presenting bus access requests to the PACP2 and identifying the MC-A devices presenting bus access requests to the to the CACP 110, the PACP and the DACP may more fairly arbitrate between, respectively, (i) the primary PCI devices and the CPU and (ii) the I/O devices supported by the expansion bridge and the direct-attached peripheral I/O devices.

Identification information relating to the peripheral I/O devices 56 presenting PCI bus access requests via the I/O controller 44 is carried by the DARBIN(0-3) inputs to and DARBOUT(0-3) outputs from the direct-attached MC-A device support portion 106. Separate DARBIN and DARBOUT lines are required because, unlike the CACP 110, the direct-attached MC-A device support portion 106 is not provided with open collector bidirectional arbitration identification lines. Otherwise, arbitration performed by the direct-attached MC-A device support portion 106 is managed as it is in the CACP 110. In this manner, the DACP 104 determines if the request presented by the CACP 110 has priority over the request presented by the I/O controller 44, and presents a BANK1_REQ# to the BACP.

All of the peripheral I/O devices 56 and the standard I/O devices 90 are assigned an arbitration priority. The DACP 104 is provided with a comparator which compares these arbitration priorities in determining which device should be granted access to the PCI bus 22. Similarly, the PACP 102 determines if the request presented by the PACP2 108 has priority over a CPU 24 request, and presents a BANK0_REQ# to the BACP 100. The BACP is programmed to provide each bank arbiter with a predetermined time period during which the appropriate bank arbiter assumes control of the PCI bus 22 on behalf of the devices for which it arbitrates. The individual bank arbiters subdivide the time allocated to them to their associated bank devices. If no bank requests are active, the BACP parks on the PACP 102 since this is where the CPU 24 resides. Arbitration information is needed from both the CACP 110 and the PACP2 108. This information is provided to the main arbiter via arbitration sideband signals. FIG. 5 is a table showing one manner in which these signals may be multiplexed.

Each of the bank arbiters has associated therewith idle and timeout signals which are output to the BACP 100. With respect to the idle signals (PACP_IDLE for the PACP 102, DACP_IDLE for the DACP 104, and PSB_IDLE for the PCI secondary bridge 80), each bank arbiter has a programmable grant timer and an idle timer. The grant timer defines the maximum time period that will be given to a bank when other banks are requesting access to the PCI bus, and defines how long the BANK0_GNT# through BANKN_GNT# signals will be driven active. The idle timer defines the maximum time period that a device may be inactive on the PCI bus before losing access to the bus. For example, if a device, having been granted access to the primary PCI bus, completes its data transfer over the bus before its time on the bus has expired, the idle timer will monitor PCI bus activity, and if no activity is detected during a predetermined number of clock cycles, access to the PCI bus is withdrawn and given to another requesting device. The timeout signals (PACP_TOUT for the PACP 102, DACP_TOUT for the DACP 104, and PSB_TOUT for the PCI secondary bridge 80) are activated when a device, having had its access to the primary PCI bus withdrawn, fails to relinquish the bus within a predetermined time period.

The BURST# input to the CACP 110 provides the means for a MC-A, already in control of the standard I/O bus and capable of bursting information over the bus, to indicate that it is ready to perform a burst operation (more than one transfer of data over the standard I/O bus). The CACP 110 responds to this request by maintaining control of the standard I/O bus in a grant mode for the bursting I/O device until all of the multiple transfers of data have been completed over the standard I/O bus. Upon completion of the burst transfer over the standard I/O bus, the I/O device deactivates the BURST# request line, and the CACP determines that the I/O device is off the bus and begins the next arbitration cycle. In non-burst transfer situations, the CACP 110 determines that the I/O device is off the bus when an end-of-transfer is indicated on the S0/S1#, BURST# and CMD# inputs to the CACP. (The direct-attached MC-A device support portion 106 determines that a peripheral I/O device has completed a data transfer via the DCHNLACT input.)

The BRIDGE_SIDEBAND signals, in addition to permitting the above-described hierarchical system of arbitration, are also monitored by the DMA controller and used to provide support for DMA cycles over the PCI bus 22, to and from standard I/O devices 90 and system memory 32. To support DMA cycles over the PCI bus 22, three categories of signals are required: bus cycle control signals, arbitration control signals, and DMA control signals. Bus cycle control signals are defined in the PCI Revision 2.0 Specification. Arbitration control signals are summarized in FIG. 4A discussed above. DMA control signals are summarized in FIG. 4B and are discussed below. In order to provide this DMA support, some of the BRIDGE_SIDEBAND signals are multiplexed to have different functions during SACP arbitration and grant modes of operation. Multiplexing the DMA control signals with the arbitration control signals reduces the pin count necessary to implement DMA cycle support on the PCI bus 22.

Once the DACP 104 indicates via the BRIDGE_GNT# line that an I/O device 90 has been granted access to the PCI bus, the CACP 110 on the I/O bridge 78 passes this identification of grant status (by changing the state of its ARBGNT# line) to the I/O device 90. The I/O device may then begin an I/O read or write cycle. If the I/O device is capable of acting as a bus master on the standard I/O bus 92, the DMA controller 40 is not required to facilitate the read or write operation. However, if the I/O device acts as a slave on the I/O bus 92, the DMA controller 40 manages the I/O cycle on behalf of the I/O device.

To manage I/O cycles on behalf of an I/O device, the DMA controller 40 must determine the bus size of the I/O device for which it is managing an I/O cycle (i.e. whether the device is an 8, 16 or 32-bit device). This dynamic bus sizing is required on behalf of the DMA controller 40 to prevent data from being lost between the DMA controller and the I/O device 90 at the I/O bridge 78. For example, if the DMA controller initiates a 32-bit write operation to an 8-bit DMA slave, the 32-bit write operation must be converted to four 8-bit write cycles. If the I/O bridge 78 buffers the 32 bits of information and subsequently performs the conversion cycles, and the I/O device indicates that it cannot accept any more data, there is no way to either continue writing to the I/O device or return the data to the DMA controller or system memory. The DMA controller in this situation has no way of knowing that the data has not been written to the I/O device. Thus, to prevent data from being lost at the I/O bridge 78, the DMA controller 40 needs to detect bus size dynamically in order to permit it and not the I/O bridge 78 to perform conversion cycles. By detecting the bus size of the I/O device for which it is performing an I/O cycle, the DMA controller 40 can buffer any data which cannot be accepted by the I/O device and can subsequently run another write cycle to the device if necessary.

The PCI bus 22, however, does not directly provide this bus sizing information between the I/O bridge 78 and the DMA controller 40. This information is instead provided by the multiplexed BRIDGE_SIDEBAND signals. As shown in FIG. 4B, several but not all of the BRIDGE_SIDEBAND signals are multiplexed. (In the MC-A context, GNT0# and GNTI# in the arbitration mode are redefined in the grant mode as, respectively, TC# and DMAACT#.) TC# is a signal driven active by the DMA controller and read by the I/O bridge 78 after the last byte of data of a particular I/O cycle is transferred into or out of the bridge. DMAACT# indicates whether the DMA controller is active or not, and is used by the bridge to determine whether a DMA slave or a bus master has been granted.

If DMAACT# is not active, the grant must have been to a bus master device on the I/O bus 92 and thus, as described above, the CACP 110 determines that the bus master device is off the bus when and end-of-transfer is indicated on the S0/S1#, BURST# and CMD# inputs to the CACP. An active DMAACT#, however, indicates to the I/O bridge 78 that the DMA controller 40 is actively facilitating a transfer to or from memory on behalf of the I/O device 90 (an I/O cycle and not a memory cycle), and thus the bridge need not perform any conversion cycles. In this case, the DMA controller performs the conversion cycles after determining from the multiplexed BRIDGE_SIDEBAND signals the type of I/O device (i.e. 8, 16 or 32-bit) on whose behalf it is performing the conversion cycles, as explained below.

DMAACT# is held low until all reads and writes have been completed. The I/O device indicates the length of the transfer by driving BURST# which is the reflected back to the DMA using the BRIDGE_REQ signal. (Although the I/O bridge may again reenter the arbitration state when the last I/O read/write occurs, the SACP 42 must remain in the grant state until deactivation of the DMAACT# line indicates that the DMA has completed transferring the data over the PCI bus.)

ARBID(1) and ARBID(2) in the arbitration mode are redefined in the grant mode as, respectively, BS16# and BSS#. Each of these signals is read by the DMA controller 40. By activating BSS#, the CACP 110 indicates to the DMA controller that the I/O device granted ownership of the PCI bus is an 8-bit device. Similarly by activating BS16#, the CACP 110 indicates that the I/O device granted ownership of the PCI bus is an 16-bit device. When both BS16# and BSS# are inactive, a 32-bit device is indicated. ARBID(3) in the arbitration mode is redefined in the grant mode as BSV#. BSV# is driven active by the I/O bridge 78 to indicate to the DMA controller the times at which the BS16# and BS8# signals are valid. These three signals, BS16#, BSS# and BSV# are required for the DMA controller to identify the I/O device on whose behalf it is performing an I/O cycle as either an 8, 16, or 32-bit device, and are used to guarantee that TC# will be driven active with correct timings with relation to the bridge cycle.

With respect to ISA implementations of the standard I/O bridge 78 and I/O bus 92, GNT0# and GNT1# in the arbitration mode are also redefined in the grant mode as, respectively, TC# and DMAACT#. However, there is no need for the bus sizing signals BSV#, BSS# AND BS16#, since the ISA bus provides for dedicated bandwidths for I/O devices attached thereto. Four of the eight channels which the ISA bus supports are dedicated for 8-bit devices and three are reserved for 16-bit devices. Hence, the DMA controller 40 knows the type of device on each of the channels and BRIDGE_SIDEBAND signals corresponding to these lines are therefore not used in the ISA context.

Accordingly, the preferred embodiment of DMA cycle logic for a multiple bus computer system including a high performance bus such as a PCI bus has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. An information processing system, comprising:
    a central processing unit (CPU);
    a first system bus which connects said CPU to system memory so that said CPU can read data from, and write data to, said system memory;
    a second system bus connected to said CPU;
    a host bridge connecting said second system bus to a peripheral bus having at least one peripheral device, including an active input/output (I/O) bridge, attached thereto;
    said active I/O bridge connecting said peripheral bus to a standard I/O bus, said standard I/O bus having a plurality of standard I/O devices attached thereto;
    arbitration logic located within said active I/O bridge which functions in an arbitration mode for arbitrating between said plurality of standard I/O devices competing for access to said standard I/O bus, and in a grant mode wherein a selected standard I/O device is granted access to said standard I/O bus;
    a direct memory access (DMA) controller for performing DMA cycles over said peripheral bus for said selected standard I/O device wherein data is transferred between said system memory and said selected I/O device without intervention by said CPU; and
    direct memory access (DMA) support logic residing on said second system bus for enabling said DMA cycles to be performed over said peripheral bus, wherein said DMA support logic includes sideband signals directly connecting said DMA support logic to said active I/O bridge independently of said host bridge, said sideband signals including (i) a DMA active line which is driven high by said DMA controller and read by said active I/O bridge to determine if said DMA controller is active, and (ii) a transfer complete line which is driven high by said DMA controller add read by said active I/O bridge to determine if data transfer into or out of said active I/O bridge has been completed.

2. The system of claim 1, wherein said sideband signals further include information identifying the bus size of said selected I/O device for which said DMA controller is performing said DMA cycles.

3. The system of claim 1, wherein said peripheral bus conforms to Peripheral Component Interconnect (PCI) architecture.

4. The system of claim 3, wherein said DMA controller resides on said peripheral bus.

5. The system of claim 3, wherein said DMA controller resides on said second system bus.

6. The system of claim 3, wherein said peripheral bus and said second system bus have data widths of at least 32 bits.

7. The system of claim 2, wherein said standard I/O bus conforms to MICROCHANNEL ® architecture.

8. The system of claim 3, wherein said standard I/O bus conforms to ISA architecture.

9. The system of claim 3, wherein said computer system further comprises (i) an I/O controller residing on said second system bus and connecting said second system bus to a peripheral I/O bus; and (ii) a plurality of peripheral I/O devices attached to said peripheral I/O bus; and wherein said DMA controller also performs DMA cycles for said peripheral I/O devices wherein data is transferred between said system memory and said peripheral I/O devices without intervention by said CPU.

10. The system of claim 3, wherein said sideband signals are multiplexed to define a first function when said arbitration logic is in said arbitration mode and to perform a second function when said arbitration logic is in said grant mode.

11. A direct memory access (DMA) support mechanism for use in a computer system which comprises (i) a central processing unit (CPU) connected to system memory by a first system bus; (ii) a second system bus connected to said CPU; (iii) a host bridge connecting said second system bus to a peripheral bus having at least one peripheral device, including an active I/O bridge, attached thereto; (iv) said active input/output (I/O) bridge connecting said peripheral bus to a standard I/O bus, said standard I/O bus having a plurality of standard I/O devices attached thereto; and (v) arbitration logic located within said active I/O bridge which functions in an arbitration mode for arbitrating between said plurality of standard I/O devices competing for access to said standard I/O bus, and in a grant mode wherein a selected standard I/O device is granted access to said standard I/O bus; said DMA support mechanism comprising:

- a direct memory access (DMA) controller for performing DMA cycles over said peripheral bus for said selected standard I/O device wherein data is transferred between said system memory and said selected I/O device without intervention by said CPU; and
- direct memory access (DMA) support logic residing on said second system bus for enabling said DMA cycles to be performed over said peripheral bus, said DMA support logic including sideband signals directly connecting said DMA support logic with the I/O bridge independently of said host bridge, said sideband signals including (i) a DMA active line which is driven high by said DMA controller and read by said I/O bridge to determine if said DMA controller is active, and (ii) a transfer complete line which is driven high by said DMA controller and read by said I/O bridge to determine if data transfer into or out of said I/O bridge has been completed.

12. The system of claim 11, wherein said peripheral bus conforms to Peripheral Component Interconnect (PCI) architecture.

13. The system of claim 12, wherein said DMA controller resides on said peripheral bus.

14. The system of claim 12, wherein said DMA controller resides on said second system bus.

15. The system of claim 12, wherein said peripheral bus and said second system bus have data widths of at least 32 bits.

16. The system of claim 11, wherein said standard I/O bus conforms to MICROCHANNEL ® architecture, and wherein said sideband signals further include information identifying the bus size of said selected I/O device for which said DMA controller is performing said DMA cycles.

17. The system of claim 12, wherein said standard I/O bus conforms to ISA architecture.

18. The system of claim 12, wherein said computer system further comprises (i) an I/O controller residing on said second system bus and connecting said second system bus to a peripheral I/O bus; and (ii) a plurality of peripheral I/O devices attached to said peripheral I/O bus; and wherein said DMA controller also performs DMA cycles for said peripheral I/O devices wherein data is transferred between said system memory and said peripheral I/O devices without intervention by said CPU.

19. The system of claim 11, wherein said sideband signals are multiplexed to define a first function when said arbitration logic is in said arbitration mode and to perform a second function when said arbitration logic is in said grant mode.

* * * * *